Feb. 3, 1970 G. M. AMANO 3,493,418
MULTILAYER COATING PROCESS
Filed Sept. 21, 1967

INVENTOR.
GEORGE M. AMANO
BY
*Lowell J. Wise*
ATTORNEY

United States Patent Office 3,493,418
Patented Feb. 3, 1970

3,493,418
MULTILAYER COATING PROCESS
George Minora Amano, Detroit, Mich., assignor to The Sherwin-Williams Company, Cleveland, Ohio, a corporation of Ohio
Filed Sept. 21, 1967, Ser. No. 669,621
Int. Cl. B44d 1/14
U.S. Cl. 117—72   7 Claims

ABSTRACT OF THE DISCLOSURE

Substrate coated with first layer containing macroscopic multicolor particles and film-forming binder including water. Second layer containing moisture-curable urethane prepolymer applied over first layer. Water from first layer migrates into second layer and effects curing of urethane prepolymer. Decorative pattern formed by macroscopic particles in first layer visible through transparent protective urethane layer. Useful for making seamless floor covering, serving counter surface, and variegated decorative areas.

DESCRIPTION

This invention relates to a novel multilayer coatings and methods for applying the different component layers. In particular, a decorative and protective coating is made by employing one layer for depositing relatively large multicolor particles in a suitable aqueous binder material and covering the particle-containing layer with one or more transparent films of a urethane prepolymer to provide a tough, protective outer surface resistant to solvents, scuffing, etc.

Urethane films are well known for their desirable properties as coatings. Common uses for these polymers are protective and decorative coatings for finishing wood, cement and other building materials. Typically, clear varnishes containing a urethane prepolymer and inert organic solvents are applied to a surface to be protected by brushing, rolling, or spraying. The moisture-curing type of polyurethanes become cross-linked by reaction with available water. The curing is usually effected by sorption of moisture from the ambient atmosphere after the coating is applied. The rate of cure is dependent upon environmental conditions, especially relative humidity. In arid climates the low amount of available atmospheric water can retard the drying time considerably. One advantage of the present invention is to provide a dependable source of water available for curing the urethane polymer by incorporating free water in an intermediate layer from which moisture can migrate readily into the urethane film to effect curing. This is achieved by formulating the intermediate layer with a film-forming binder containing water.

The primary object of this invention is to provide a variegated coating, and this is achieved by applying macroscopic particles of various sizes and colors with the film-forming binder.

THE DRAWING

Figure 1:
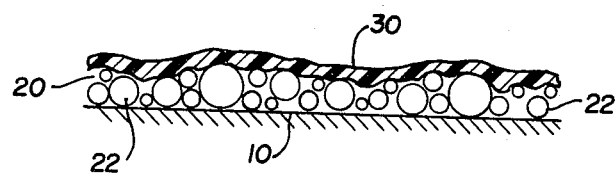
FIG. 1 is a cross-sectional view of a typical coated substrate according to this invention.

Referring to FIG. 1, a typical coating is made by applying to a substrate 10 a first coating containing an adhesive film-forming binder 20 and macroparticles 22. This first coating has an aqueous emulsion of organic polymer and macroparticles which can be applied to a bare surface or ground coat by conventional methods, such as brushing, spraying, troweling, etc. When the volatile components are removed from this layer, the adhesive binder forms a continuous or botryoid film around the macroparticles which film is substantially transparent to light and also binds the particles to the substrate and to one another, building about 1/16 to 1/4-inch thickness.

While the water-containing film 20 is still wet, a second film 30 of moisture-curing urethane prepolymer is applied directly over the wet undercoat 20, 22 or after a thin water-permeable intermediate film has been applied. Thus, water from the first coating composition migrates from film 20 to film 30 to provide curing of the urethane polymer. Subsequent top layers of urethane or other material can be added to build the protective film thickness, if desired.

When the urethane layer 30 is applied evenly, as by spraying, the top surface assumes the approximate profile of the randomly-oriented macroparticles. This produces an interesting pebbled effect. The ornamental patterns created by using different colors for mixed particles are three-dimensional. Light passes through the upper urethane layer 30 and binder 20, so that light reflected from the macroparticles creates a variegated design. The binder and/or urethane polymers can be tinted and still permit part of the visible spectrum to reach the particles and be reflected or absorbed by the particle surfaces.

For more applications the macroparticles should be large enough to be seen readily by the naked eye at distances of a few feet. A preferred size range for the particles is about 100 microns to several millimeters; however, the maximum dimension is not critical and larger particles can be used for certain uses.

Figure 2:
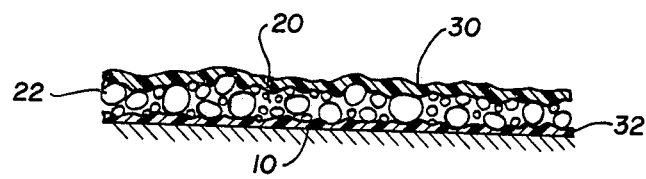
FIG. 2 is a similar view showing urethane bottom and top layers with a decorative intermediate layer. Film thickness in the drawing is exaggerated to depict the invention more easily.

A urethane base coat may be used between the bare substrate 10 and the particle containing layer 20, 22. This is shown in FIG. 2, where a moisture-curing urethane prepolymer forms bottom layer 32 as well as top layer 30. The uncured urethane on both sides of intermediate layer 20 is cured by water migrating from the adjacent aqueous coating applied between the uncured urethane films.

The macroparticles used in this invention may be chosen from a wide variety of organic polymers, including vinyl chloride, olefins, urea-formaldehydes, urethanes, etc. The particles may be solid or cellular and numerous decorative effects can be achieved using different particle shapes. For instance, interesting terrazo effects are obtained from flat plates or chips. Such particles suitable for making floor, wall or roof coatings are described in U.S. Patent 2,962,081.

Resilient coatings having excellent acoustical and insulating properties are obtained using foamed bead macroparticles. A typical method for making cellular polyvinyl chloride beads from resin particles, plasticizer and blowing agent is described in copending U.S. patent application Ser. No. 483,297, filed Aug. 27, 1967 (now abandoned) and assigned commonly with this application. These particles are advantageous in that they provide elasticity, durability and easy pigmenting. Where elastic recovery is not needed, ordinary polystyrene foam beads used in molding containers can be used. Valuable decorative and mechanical effects can be achieved by mixing polymeric macroparticles with fiber flock in the aqueous coating compositions.

The adhesive binder material used to hold the macroparticles is usually a clear polymer. The particles are admixed with the binder material and applied to the substrate together. Typical aqueous latex compositions include those described in U.S. Patents 3,058,931 and 3,058,932. The important properties of the binder for this invention are the presence of water available for curing the urethanes and formation of a clear coating upon drying. The proportions of binder to particles in this layer are not critical, but there should be sufficient binder to prevent voids in the layer. The following example is a suitable latex formulation: 217 parts by weight water; 596 parts latex vehicle containing 45% ethyl acrylateacrylonitrile copolymer and 55% water; and 4.5 parts sodium carboxymethyl cellulose.

Moisture-curing urethane prepolymers useful as the top layer of the multilayer coating include the reaction products of primary and secondary diols and triols with a polyisocyanate. Aromatic diisocyanates, especially toluene diisocyanate (TDI), are preferred reactants. A typical urethane prepolymer is made by reacting 1 mol of a triol, 2 mols of a diol and 5 mols of TDI. The molecular weight of the polyols can vary from about 400 to several thousand. Polypropylene glycol (400) is a preferred diol, and propylene oxide reacted with trimethylolpropane, glycerine or 1,2,6-hexanetriol produce suitable triols. Tetrols, such as produced from pentaerythritol and propylene oxide, can also be used. The monomers are usually reacted at 125 to 190° C. for a few hours until the desired isocyanate (NCO) content is obtained. The prepolymer can be dissolved in a non-aqueous inert solvent, such as an organic ester, aromatic hydrocarbon or ketone to achieve the desired properties for application by brushing, spraying or other conventional methods. A preferred solvent contains a mixture of ethylene glycol monoethyl ether acetate, aromatic hydrocarbon and at least 1% ditertiarybutyl paracresol. A suitable urethane prepolymer coating composition can have the following properties: viscosity, 90–150 cps.; NCO content, 2.6–2.9%; solids content, 40%; Gardner color, 1 max.; and flash point, 81° F. min. This produces a cured coating having a tensile strength of about 5500 p.s.i., 75% elongation, Sward hardness of 35–40, and 60° gloss of 90%+.

Commercially available urethane coating compositions include Trancoa 542F and Q Thane 501, and a moisture curing urethane is described in U.S. Patent 3,180,753.

Slow evolution of carbon dioxide during curing of the urethane by water reaction can produce bubbles in thicker films. However, in the usual application of urethane by spraying, a film build-up of 1 to 20 mils (dry) is sufficiently thin to permit escape of the carbon dioxide by permeation without forming bubbles in the film.

What is claimed is:

1. A coating process including the steps of applying to a substrate a layer of a first coating composition comprising flexible organic polymeric macroparticles dispersed in an aqueous liquid containing a film-forming binder; applying over the first coating composition while said first coating composition is wet at least one layer of a non-aqueous second coating composition containing a water-curing polyurethane prepolymer resin; and permitting water from the first coating composition to migrate into the second coating composition to cure the prepolymer resin.

2. The coating process of claim 1 wherein the polyurethane prepolymer consists essentially of the reaction product of aromatic diisocyanate with polyhydric alcohol selected from the group consisting of primary and secondary diols and triols, polyglycols and propoxylated glycols.

3. The coating process of claim 2 wherein the polyurethane prepolymer is dissolved in a mixture of ethylene glycol monoethyl ether acetate and aromatic hydrocarbons containing at least 1% ditertiarybutyl paracresol.

4. The coating process of claim 1 wherein the macroparticles include multicolored cellular pigmented particles having a size range of about 100 microns to several millimeters maximum dimension.

5. The coating process of claim 1 wherein the first coating composition includes a mixture of multicolored macroparticles and fiber flock.

6. The coating process of claim 1 wherein the macroparticles include large thermoplastic chips.

7. A process for coating a substrate with a multilayer variegated decorative film comprising the steps of:
applying to the substrate a layer of water-containing film-forming binder and a plurality of multicolored flexible organic macroparticles; and
applying directly over the water-containing layer a transparent non-foaming moisture-curable polyurethane prepolymer in an inert non-aqueous solvent, whereby water from the water-containing layer migrates into the polyurethane film and reacts with the prepolymer to cure the polyurethane.

References Cited
UNITED STATES PATENTS

| | | |
|---|---|---|
| 2,294,930 | 9/1942 | Palmquist. |
| 2,591,904 | 4/1952 | Zola _____ 117—39 |
| 2,962,081 | 11/1960 | Dobry et al. _____ 18—11 |
| 2,987,102 | 6/1961 | Heinrichs. |
| 3,180,753 | 4/1965 | Fritsch et al. _____ 117—45 |
| 3,356,634 | 12/1967 | McGinley. |

MURRAY KATZ, Primary Examiner

R. HUSACK, Assistant Examiner

U.S. Cl. X.R.

117—45, 62.2, 123, 148